W. C. HUNTER.
EGG TESTER.
APPLICATION FILED MAR. 30, 1908.
917,767.
Patented Apr. 13, 1909.
2 SHEETS—SHEET 1.
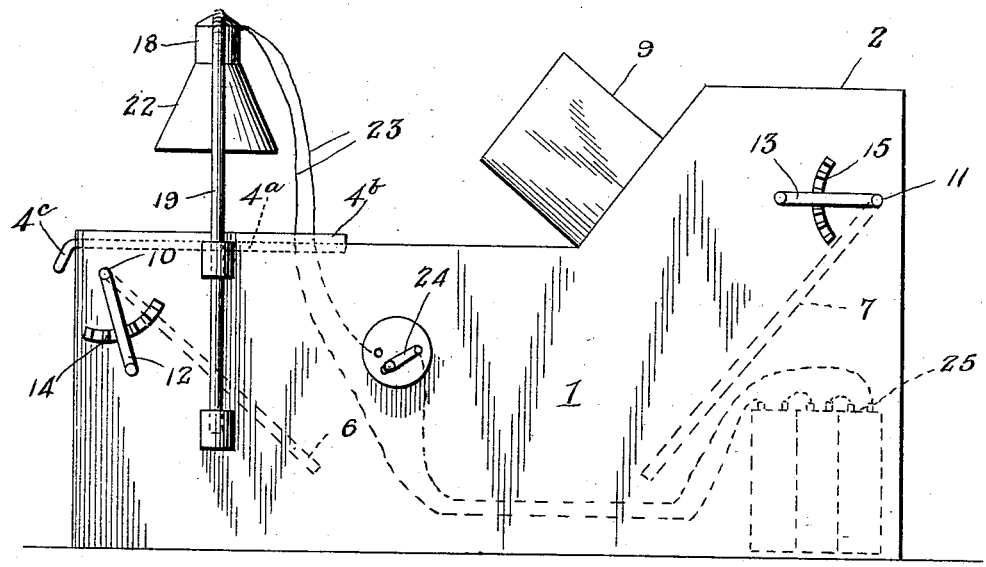
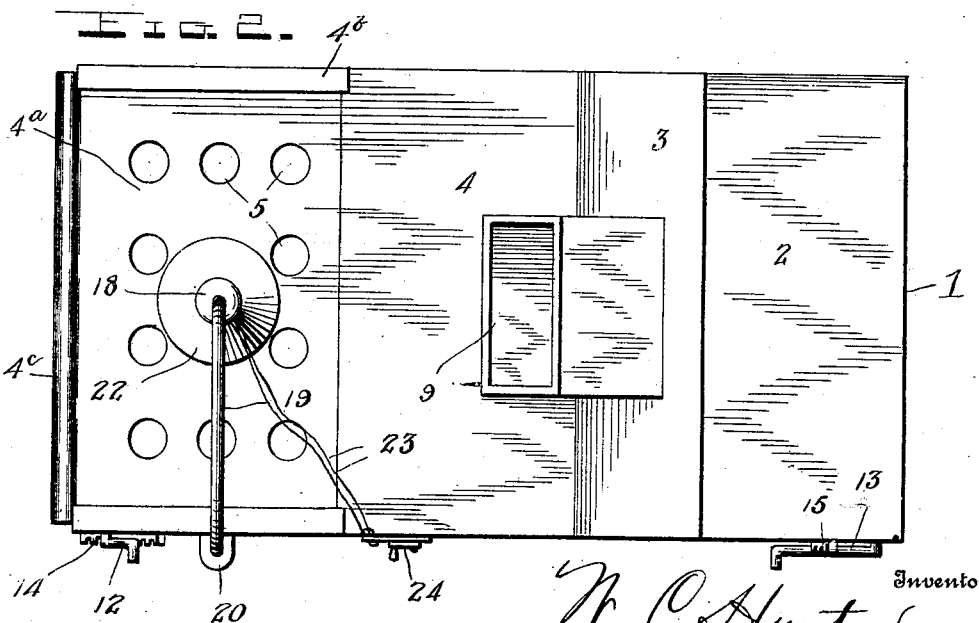
Witnesses
Chas. L. Griesbauer.
M. L. Skinner.
Inventor
W. C. Hunter
By Watson E. Coleman
Attorney W. C. HUNTER.
EGG TESTER.
APPLICATION FILED MAR. 30, 1908.
917,767.
Patented Apr. 13, 1909.
2 SHEETS—SHEET 2.
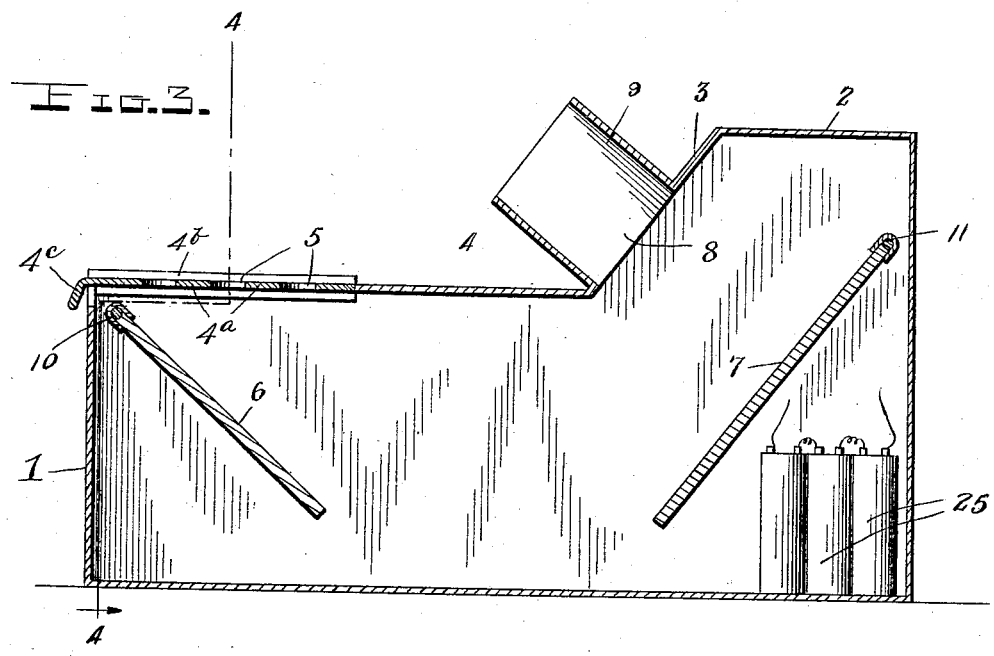
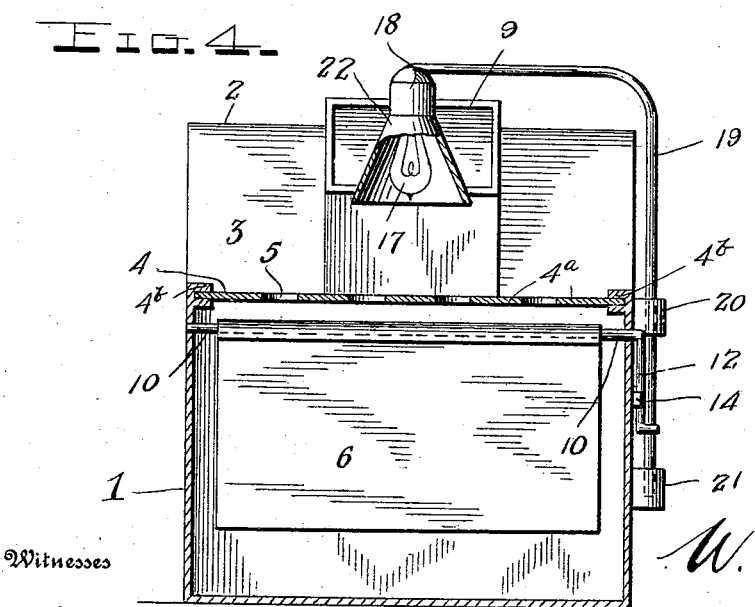

UNITED STATES PATENT OFFICE.

WILLIAM C. HUNTER, OF CORA, ILLINOIS.

EGG-TESTER.

No. 917,767.  Specification of Letters Patent.  Patented April 13, 1909.

Application filed March 30, 1908. Serial No. 424,261.

*To all whom it may concern:*

Be it known that I, WILLIAM C. HUNTER, a citizen of the United States, residing at Cora, in the county of Jackson and State of Illinois, have invented certain new and useful Improvements in Egg-Testers, of which the following is a specification, reference being had to the accompanying drawings.

My invention relates to improvements in egg testers, and consists of the novel features of construction and the combination and arrangement of parts hereinafter fully described and claimed.

The object of the invention is to improve and simplify the construction and operation of devices of this character and thereby render them more convenient and satisfactory.

The above and other objects of the invention are attained in its preferred embodiment illustrated in the accompanying drawings, in which—

Figure 1 is a side elevation of my improved egg tester; Fig. 2 is a top plan view; Fig. 3 is a vertical longitudinal section; and Fig. 4 is a vertical transverse section.

My improved egg tester comprises a substantially rectangular body 1 preferably, but not necessarily, constructed of sheet metal and having adjacent its rear end an upwardly extending enlarged portion 2, the front face 3 of which latter is inclined downwardly and forwardly, as shown. In the top 4 of the body 1 adjacent to the front end of the same are a plurality of openings 5 to receive the eggs to be tested, said openings being of less diameter than the eggs so that only the ends of the latter will project into the body. It will be understood that any number of the egg openings 5 may be provided so that any number of eggs may be simultaneously tested. Instead of forming the egg openings 5 in an integral part of the top 4 I may remove the outer portion of said top and employ a removable slide 4ª to cover such opening. As illustrated, said cover slide 4ª is formed with the egg openings and has its opposite side edges mounted for sliding movement between guide ribs or flanges 4ᵇ and its outer end may be provided with a suitable hand piece 4ᶜ by means of which it may be conveniently applied to or removed from the body 1. By providing two or more removable slides or trays of this character it will be seen that one may be in use upon the body while the eggs are being applied to or removed from the others, thereby permitting a large number of eggs to be tested in a very short time.

6 and 7 denote two mirrors or reflectors arranged within the body, one in its front portion beneath the egg openings 5 and the other in the enlarged rear portion 2 opposite a sight opening 8 formed in the inclined wall 3 and surrounded by a hood or tube 9. The latter may be of any suitable form and construction but is preferably disposed angularly so that when the device is upon a counter or table, a person standing or sitting near the same may look through the opening 8 and into the body. The reflectors 6, 7 are disposed angularly in the body, as clearly shown in Fig. 3, with their reflecting surfaces opposite each other, and in order to permit persons of different height or in different sitting or standing positions to look through the sight opening 8 and see the reflected images of the eggs in the reflector 7, I pivotally mount both of the mirrors so that they may be adjusted angularly. While I may mount and adjust said reflectors in any suitable manner, I preferably pivot or hinge them at their upper ends upon transverse pivot rods 10, 11 which have one end projecting through one of the side walls of the body or box 1 and bent at right angles to provide operating crank arms or levers 12, 13. The latter are somewhat resilient so as to spring into engagement with segmental locking racks 14, 15 arranged upon said side of the body, as clearly shown in Fig. 1. It will be seen that when the reflectors are thus mounted they may be readily moved to angular positions and secured in such positions by grasping the arms or levers 12, 13, springing them outwardly to disengage their locking racks, then swinging them angularly to adjust the reflectors and then releasing them so that they engage their racks to retain the reflectors in their adjusted position. It will be understood that any other suitable means may be provided for mounting and adjusting the reflectors.

While the device may be used in sun light or artificial light of any description, I preferably provide it with a lighting attachment which is exceedingly advantageous when it is used in a cellar or a dark room where artificial light cannot be readily obtained. This attachment comprises an electric incandescent lamp 17 arranged in a lamp socket 18 suspended from the curved upper end of a supporting rod or post 19, the straight lower end of which is pivotally and removably mounted upon the body or box 1. This mounting of said lamp support is preferably effected by providing upon one side of the body bearing sockets 20, 21 in which the cylindrical lower end of said support or rod may be inserted and may be revolved so as to dispose the lamp 17 immediately above the center of the top of the box containing the openings 5. By mounting the lamp support in this manner it may be readily removed when not needed and it may be turned to one side out of the way while eggs are being placed in or removed from the openings 5. The bearing 20 is in the form of an apertured lug or projection while the bearing 21 is in the form of a lug or projection having a socket to receive the lower extremity of the supporting rod 19. The funnel shaped reflector 22 is preferably used in connection with the lamp 17 so as to confine and reflect the light upon the eggs in the openings 5. The lamp is included in an electric circuit 23 in which is also included a suitable switch 24 and a battery 25 or any other suitable electric generator. As shown, the battery 25 is arranged within the body beneath the reflector 7 and the switch is upon one of the sides of the body but it will be understood that said switch may be in the form of a key in the socket 18 of the lamp and that an electric current may be obtained from any other suitable source than the battery 25.

From the foregoing description taken in connection with the accompanying drawings it is thought that the construction, operation and advantages of my improved egg tester will be readily understood without a more extended explanation.

Having thus described my invention what I claim is:

1. An egg tester comprising a rectangular body having an elevated portion at its rear end, the front face of said elevated portion being provided with a sight opening and the front portion of the top of the body being provided with openings to receive eggs, and angularly disposed reflectors arranged in the body, one beneath the egg openings and the other opposite the sight opening.

2. An egg tester comprising a rectangular body having an elevated portion at its rear end, the front face of said elevated portion being provided with a sight opening and the front portion of the top of the body being provided with openings to receive eggs, reflectors arranged in the body, one beneath the egg openings and the other opposite the sight opening, and means for adjusting said reflectors angularly.

3. An egg tester comprising a rectangular body having an elevated portion at its rear end, the front face of said elevated portion being provided with a sight opening and the front portion of the top of the body being provided with openings to receive eggs, reflectors pivoted in the body one beneath the egg openings and the other opposite the sight opening, hand levers carried by the pivots of said reflectors and arranged upon the exterior of the body, and means adapted to be engaged with said levers for retaining the reflectors in adjusted angular positions.

4. An egg tester comprising a rectangular body having an elevated portion at its rear end, the front face of said elevated portion being provided with a sight opening and the front portion of the top of the body being provided with openings to receive eggs, resilient levers carried by the pivots of said reflectors and arranged upon the exterior of the body, and segmental racks arranged upon the exterior of the body concentrically with said pivots and adapted to be engaged by said levers to retain the reflectors in adjusted angular positions.

5. An egg tester comprising a rectangular body having an elevated portion at its rear end, the front face of said elevated portion being provided with a sight opening and the front portion of the top of the body being provided with guides, a removable slide engaged with said guides and having openings to receive eggs, reflectors arranged in the body, one beneath the egg openings and the other opposite the sight opening, and means for adjusting said reflectors angularly.

6. An egg tester comprising a rectangular body having an elevated portion at its rear end, the front face of said elevated portion being provided with a sight opening and the front portion of the top of the body being open and provided with guides, an apertured egg slide removably engaged with said guides and angularly disposed reflectors arranged in the body, one beneath the egg openings in the slide and the other opposite the sight opening.

In testimony whereof I hereunto affix my signature in the presence of two witnesses.

WILLIAM C. HUNTER

Witnesses:
  W. H. SPINNER,
  CHARLES BROWN.